June 26, 1962     C. V. RYDEN ETAL     3,040,517
RELEASABLE ROCKET NOZZLE
Filed June 27, 1960

INVENTORS
CARL V. RYDEN
E. QUIMBY SMITH JR.
BY    LYLE E. MATTHEWS

ATTORNEY

United States Patent Office 3,040,517
Patented June 26, 1962

3,040,517
RELEASABLE ROCKET NOZZLE
Carl V. Ryden, E. Quimby Smith, Jr., and Lyle E. Matthews, Ventura County, Calif., assignors to the United States of America as represented by the Secretary of the Navy
Filed June 27, 1960, Ser. No. 39,196
5 Claims. (Cl. 60—35.6)
(Granted under Title 35, U.S. Code (1952), sec. 266)

The invention described herein may be manufactured and used by or for the Government of the United States of America for governmental purposes without the payment of any royalties thereon or therefor.

The present invention relates to a releasable rocket nozzle and more particularly to a booster nozzle which is releasable from a ram-jet vehicle a predetermined time after a booster motor is fired.

It is well known that a ram-jet vehicle must attain a certain speed in the earth's atmosphere before it will begin to operate and it is because of this requirement that a booster motor is employed. Accordingly, a booster motor is used to bring the vehicle to the operable ram-jet speed at which time the ram-jet motor commences to operate and the booster motor ceases to operate. Present ram-jet vehicles having a booster motor have developed the ram-jet and the booster thrusts through a single nozzle or through unreleasable dual nozzles. In the former it is readily apparent that because of design and the varying principles between a booster motor and a ram-jet motor the use of a single nozzle for both motors is a compromise in the potential thrust component of one or both of the motors. In order to develop the optimum thrust from both motors two different sized rocket nozzles will be required. Accordingly dual nozzles have been employed but there has been no provision for releasing the booster nozzle after the booster is exhausted resulting in an obstruction to the exhaust from the ram-jet motor and a reduction in overall efficiency due to the dead weight of the booster nozzle. The present invention overcomes the problems encountered above by providing a releasable booster nozzle which is released when the booster motor nears its completion after which the ram-jet motor continues the thrust through a ram-jet nozzle. By releasing the booster nozzle after it has served its useful function the inefficiencies of a single nozzle for both the booster and ram-jet, an obstruction by the booster nozzle to the ram-jet exhaust and carrying the booster nozzle as unnecessary weight are all overcome. This is accomplished by providing a booster nozzle which is secured within and released from the ram-jet nozzle by the engagement and disengagement respectively of two bearings faces, the engagement of the bearing faces being maintained by the thrust from the booster motor until such time that a biasing means attached to one of the faces overcomes the frictional force between the faces causing disengagement and the release of the booster nozzle.

An object of the present invention is to provide a nozzle which is releasable from a rocket vehicle at a predetermined time.

Another object is to provide a releasable booster nozzle for a rocket vehicle of the type which is initially propelled by a booster motor and then by a ram-jet motor.

A further object of the invention is to provide a device for increasing the efficiency of a ram-jet vehicle which is initially propelled by a booster motor.

Other objects and many of the attendant advantages of this invention will be readily appreciated as the same become better understood by reference to the following detailed description when considered in connection with the accompanying drawings wherein.

Figure 1:
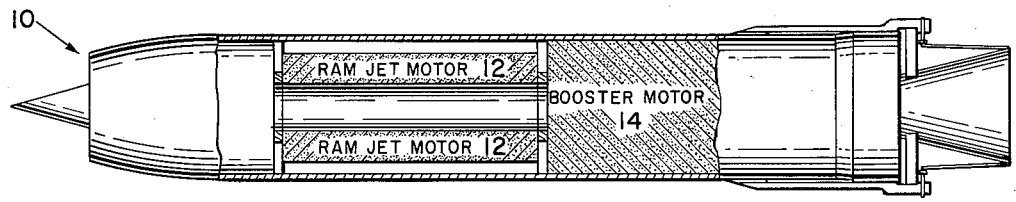
FIG. 1 is a side view, partly in cross-section, of a ram-jet type rocket vehicle.
Figure 2:
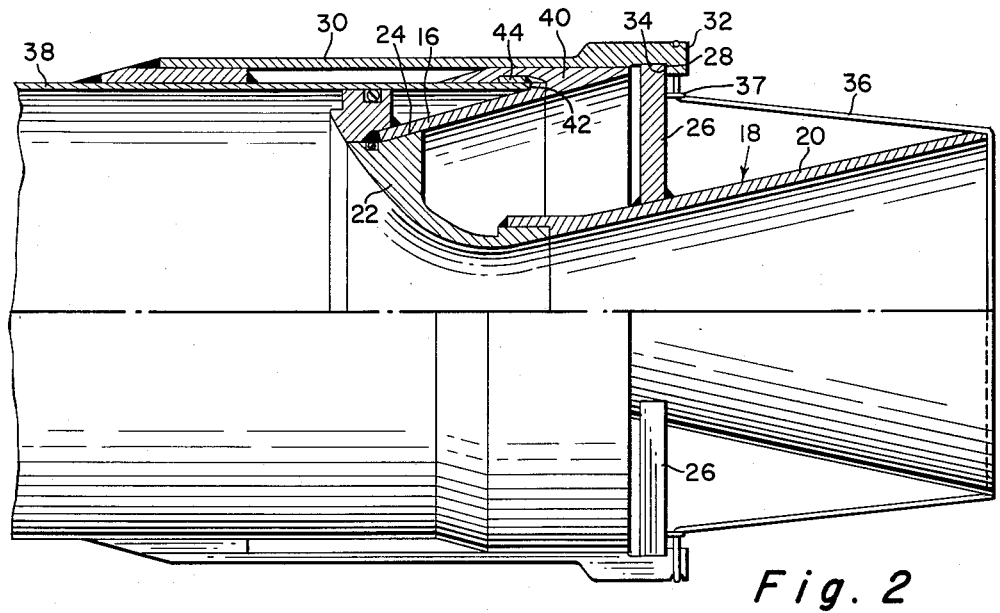
FIG. 2 is a cross-sectional view of the after portion of the rocket vehicle in FIG. 1 showing the ram-jet nozzle and the releasable booster nozzle.
Figure 3:
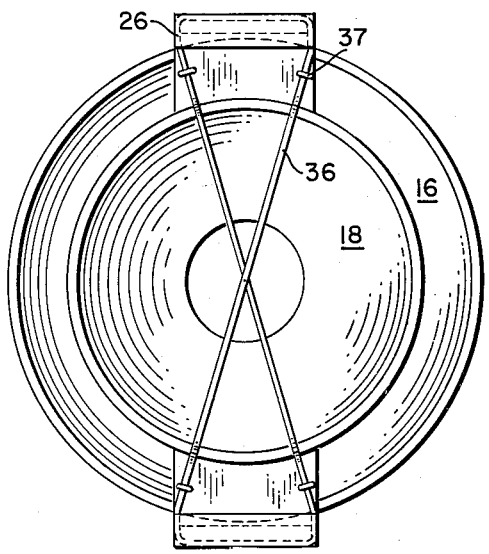
FIG. 3 is an end view of FIG. 2.

Referring now to the drawings, wherein like reference characters designate like or corresponding parts throughout the several views, there is shown in FIG. 1 a ram-jet vehicle 10 which has a ram-jet motor 12 and a booster motor 14. Each of the motors 12 and 14 exhaust through a respective rocket nozzle, the ram-jet motor 12 exhausting through a ram-jet nozzle 16 and the booster motor 14 exhausting through a releasable booster nozzle 18. As shown in FIG. 2 the booster nozzle 18 has conical portion 20 and a flared portion 22, the latter portion being subjected to a force in an after direction because of the exhaust from the booster motor 14. The booster nozzle 18 is movable in and out of the ram-jet nozzle 16, the in-movement of the booster nozzle being limited by an engagement of a periphery 24 of the flared portion 22 with the ram-jet nozzle 16. Fixedly attached to the booster nozzle 18 are flanges 26, each of which has a pressure bearing face 28 facing in an aft direction. Cantilever springs 30, each having a ridge 32, are fixedly attached to the vehicle 10 for biasing in an outward direction with respect to the vehicle. The ridges 32 each have a sliding bearing face 34 which will engage and disengage a respective pressure bearing face 28 depending upon the biasing of the springs 30, the engagement of the bearing faces 28 and 34 locking the booster nozzle 18 within the ram-jet nozzle 16 and the disengagement of the bearing faces unlocking the nozzles from one another. The bearing faces 28 and 34 are held in an engaged relationship by a retainer wire 36 which is wrapped around the outer surface of each cantilever spring 30 and which travels through eyes 37 and across an exhaust opening of the booster nozzle 18 as shown in FIG. 3. The retainer wire 36 is to be of such a material and size that the heat from the booster motor 14 will sever the wire 36 across the exhaust opening of the booster nozzle 18 thereby terminating the inward restraining effect of the wire on the cantilever spring 30. The bearing faces 28 and 34 each have such a coefficient of friction that after firing the booster motor the after force of the booster exhaust on the booster nozzles causes a friction force along the plane of engagement of the faces 28 and 34 which overcomes the outwardly biasing force of a respective spring 30 until the operation of the booster motor nears completion. When the operation of the booster motor nears completion and the aft force of the booster exhaust decreases a predetermined amount, the outward biasing force of a respective spring 30 overcomes the friction force between the bearing faces 28 and 34 causing their disengagement, the unlocking of the nozzles 16 and 18 from one another and a departure of the booster nozzle 18 from the vehicle 10.

After the booster nozzle 18 departs from the vehicle 10 the latter is propelled by the ram-jet motor 12 which exhausts through the ram-jet nozzle 16. The ram-jet nozzle 16 is attached to a casing 38 of the vehicle 10 by a split ring 40 which abuts an end 42 of the ram-jet nozzle after the split ring is spread apart and snapped into position over a rim 44 on the casing 38.

In the operation of the vehicle 10 having a ram-jet nozzle 16 and a booster nozzle 18 as described above it is apparent that prior to firing the booster motor 14 the booster nozzle is secured in place by the retainer wire 36 which holds the bearing faces 28 and 34 in engagement. After firing the booster motor the exhaust through the booster nozzle 18 severs the retainer wire 36 thereby terminating the inward restraining effect of the wire 36 on the cantilever springs 30. Also at the time of firing the booster motor the exhaust therefrom, especially by its action on the flared portion 22 of the booster nozzle, forces the pressure bearing face 28 against the sliding bearing face 34 causing a friction force between the bearing faces 28 and 34 which is sufficient to overcome the outward biasing force of a respective cantilever spring 30. As the operation of the booster motor 14 nears completion and accordingly when the thrust of the booster motor 14 decreases a predetermined amount, the outward biasing effect of a respective cantilever spring 30 will overcome the friction force between the bearing faces 28 and 34 so that the sliding bearing faces 34 will slide away from the pressure bearing face 28 unlocking the booster nozzle 18 from the ram-jet nozzle 12. After the nozzles 18 and 12 are unlocked from one another the booster nozzle 18 is free to move in an after direction from the ram-jet nozzle 16 and with the aid of air friction on the exterior of the booster nozzle 14 and with the aid of the remaining thrust of the booster motor and/or the beginning thrust of the ram-jet motor the booster nozzle 18 will depart from the vehicle 10. When the operation of the booster motor is completed or near completion the vehicle 10 will have sufficient speed to sustain the ram-jet motor 12 and accordingly the ram-jet motor is fired to continue the propulsion of the vehicle 10.

It is now apparent that the above-described releasable booster nozzle will eliminate the deficiencies which exist because of operating both a booster motor and a ram-jet motor through a single nozzle or the efficiencies which exist when a permanently secured booster nozzle is used in addition to a ram-jet nozzle. Accordingly, the releasable booster nozzle enables any rocket vehicle to develop more thrust than could be obtained by using a single nozzle or two permanently secured nozzles.

Obviously many modifications and variations of the present invention are possible in the light of the above teachings. It is therefore to be understood that, within the scope of the appended claims, the invention may be practiced otherwise than as specifically described.

We claim:

1. A mechanism for disposing a rocket nozzle from a rocket vehicle comprising the rocket nozzle and the vehicle each having a fore end and an aft end, the rocket nozzle engaging the rocket vehicle and being movable out of the rocket vehicle, said rocket nozzle being biased in an aft direction by thrust from a rocket propellant, the rocket nozzle having at least one pressure bearing face facing in an aft direction, said pressure bearing face being biased in an aft direction by the thrust of the propellant on said nozzle, the vehicle having at least one movable sliding bearing face facing in a forward direction to slidingly engage and disengage said pressure bearing face, the engagement of the two bearing faces locking the nozzle to the vehicle and the disengagement of the two bearing faces unlocking the nozzle from the vehicle, biasing means attached to the sliding bearing face for disengaging the two bearing faces and retainer means which can be destroyed by the heat of the rocket propellant for holding the engagement of the two faces whereby after firing the propellant the retainer is destroyed and the two bearing faces are held in engagement by the thrust of the rocket propellant until the thrust decreases a predetermined amount at which time the biasing means disengages the two bearing faces and allows the rocket nozzle to be discarded from the rocket vehicle.

2. A mechanism for disposing a rocket nozzle from a rocket vehicle as claimed in claim 1 wherein said biasing means is a cantilever spring.

3. A mechanism for disposing a rocket nozzle from a rocket vehicle as claimed in claim 2 wherein said retainer means is a wire which is partially exposed to an exhaust from the rocket propellant.

4. A rocket vehicle of the type which is propelled first by a booster and then by a ram-jet comprising a body having an aft end, a substantially conical shaped ram-jet nozzle mounted near the aft end of the body with the ram-jet nozzle diverging in an aft direction, a booster nozzle which has a conical portion and a flared portion, the booster nozzle diverging in an aft direction and being movable in and out of the ram-jet nozzle, the in-movement of the booster nozzle within the ram-jet nozzle being limited by the periphery of the flared portion, said flared portion being positioned with its convex side facing the exhaust from the booster so that the exhaust will exert an aft force on the booster nozzle, said booster nozzle having a pressure bearing face which faces in an aft direction, at least one cantilever spring mounted on the body for biasing in a radially outward direction with respect to the rocket vehicle, said cantilever spring having a ridge, said ridge having a sliding bearing face which engages the pressure bearing face when the cantilever spring is biased inwardly a predetermined amount and which disengages the pressure bearing face when the cantilever spring is in a relaxed position, the engagement of the two bearing faces securing the booster nozzle within the ram-jet nozzle and the disengagement of the two nozzles allowing the booster nozzle to be moved aft and out of the ram-jet nozzle, each of said bearing faces having a particular coefficient of friction so that when the booster is in operation the engagement of said bearing faces causes a predetermined friction force between said bearing faces, said predetermined friction force being of such a magnitude that during the majority of the time of the operation of the booster the friction force is greater than the outward force of the cantilever spring and thereafter at a low critical booster thrust value the outward force of the cantilever spring overcomes the frictional force thus disengaging said bearing faces, a retainer wire mounted on the rocket vehicle and secured to the cantilever spring, said retainer wire inwardly biasing the cantilever spring so that the bearing faces are in engagement, said retainer wire traversing the exhaust of the booster and being of such a material and size that the exhaust from the booster will sever the wire whereby after firing the booster the booster nozzle remains within the ram-jet nozzle until the low critical booster thrust value is reached at which time the booster nozzle departs from said rocket vehicle.

5. A mechanism for disposing a rocket nozzle from a rocket vehicle comprising the rocket nozzle and the vehicle each having a fore end and an aft end, the rocket nozzle engaging the rocket vehicle and being movable out of the rocket vehicle, said rocket nozzle being biased in an aft direction by thrust from a rocket propellant and having at least one pressure bearing face facing in an aft direction, said pressure bearing face being biased in an aft direction by the thrust of the propellant of said nozzle, the vehicle having at least one movable sliding bearing face facing in a forward direction to slidingly engage and disengage said pressure bearing face, the engagement of the two bearing faces locking the nozzle to the vehicle and the disengagement of the two bearing faces unlocking the nozzle from the vehicle and biasing means attached to the sliding bearing face for disengaging the two bearing faces whereby the thrust of the rocket propellant engages the two bearing faces until such time that the biasing means overcomes a friction force therebetween thus disengaging the two bearing faces and allowing the rocket nozzle to depart from the rocket vehicle.

References Cited in the file of this patent

UNITED STATES PATENTS

| | | |
|---|---|---|
| 2,596,644 | Bradford et al. | May 13, 1952 |
| 2,655,105 | Hansche | Oct. 13, 1953 |
| 2,721,517 | Workman | Oct. 25, 1955 |
| 2,804,823 | Jablansky | Sept. 3, 1957 |
| 2,937,595 | Margulis et al. | May 24, 1960 |